United States Patent Office 3,188,617
Patented June 8, 1965

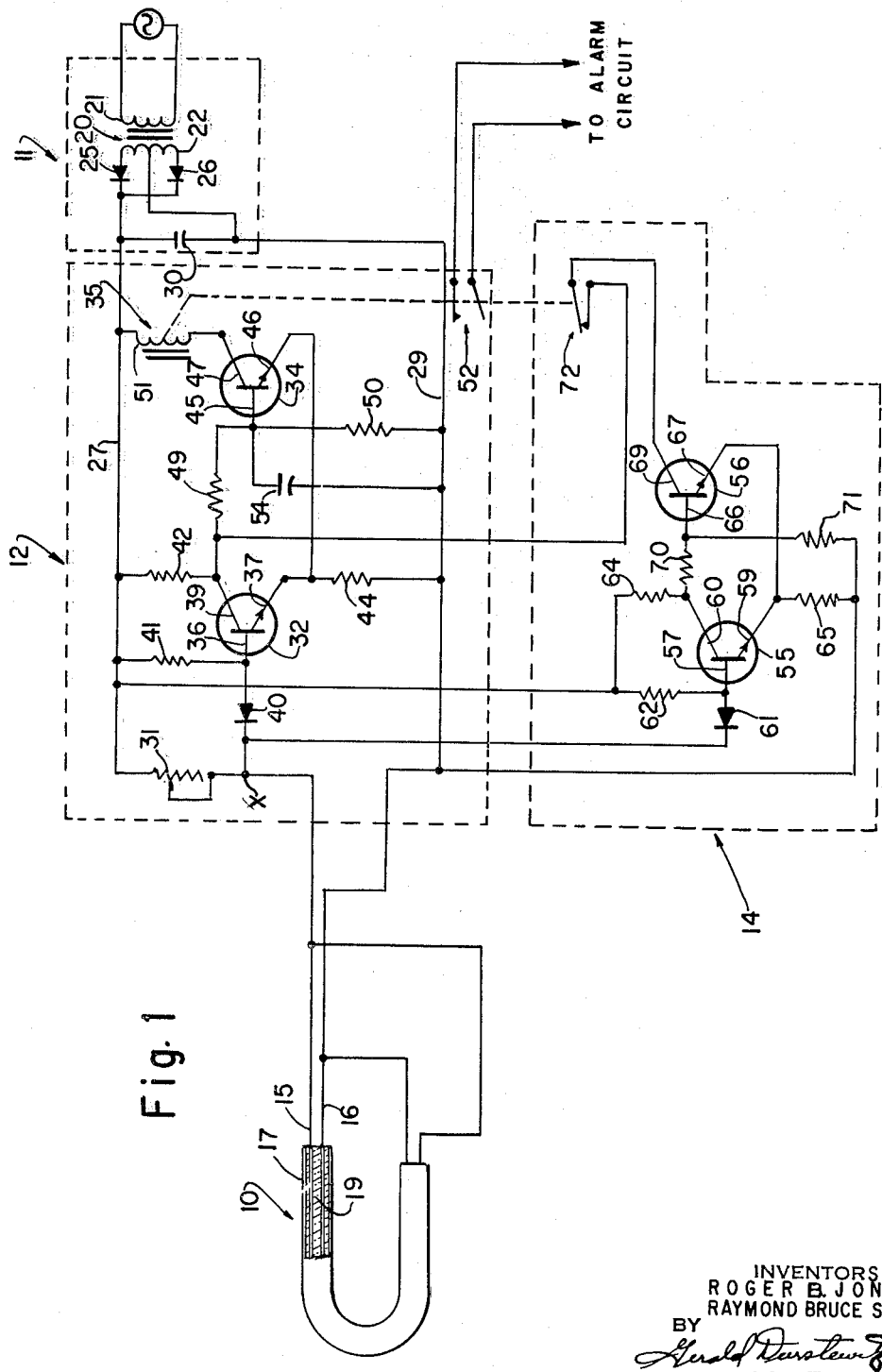

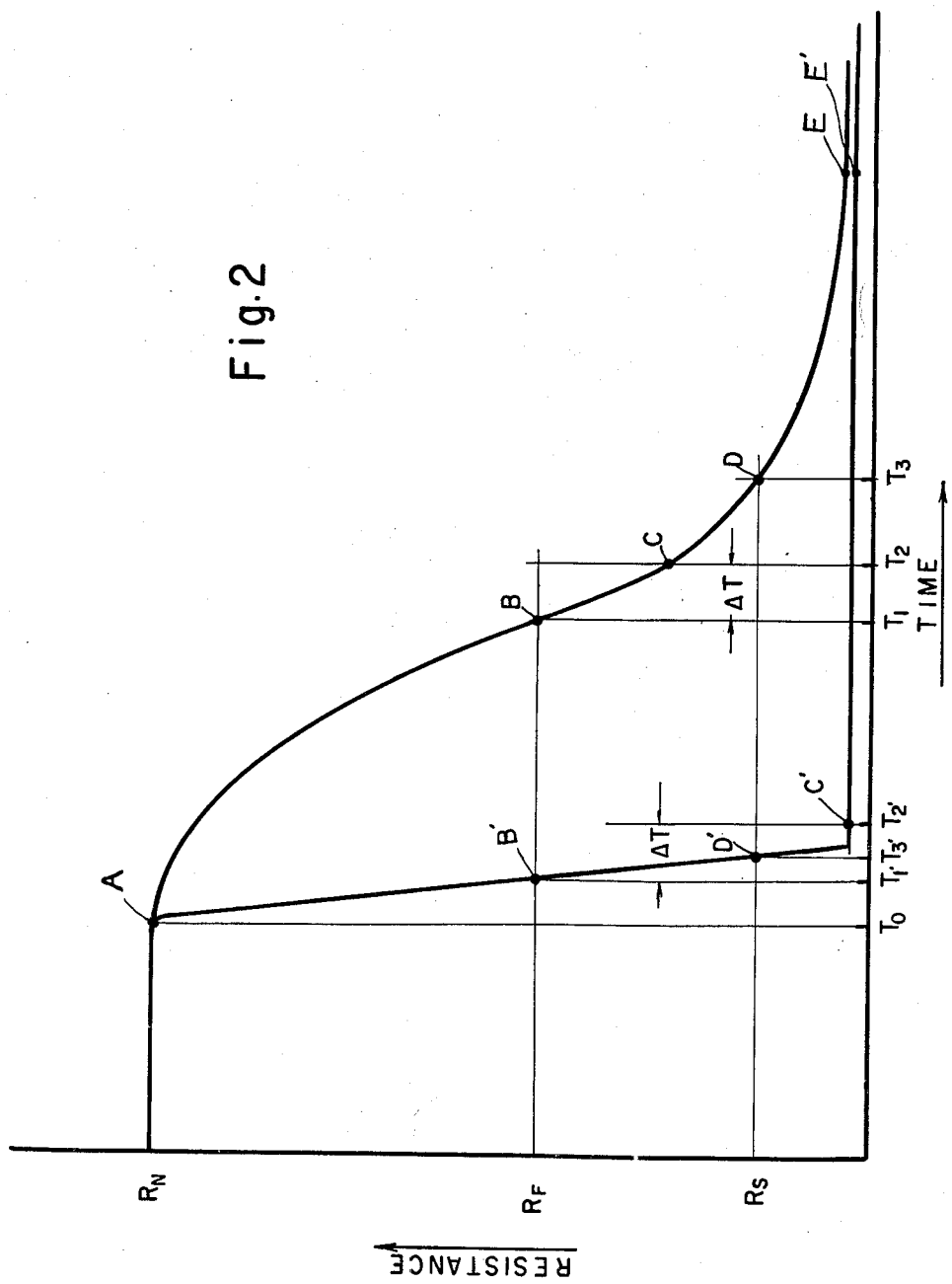

3,188,617
CONDITION RESPONSIVE SYSTEM WITH PREVENTION OF FALSE INDICATION
Roger B. Jones, North Caldwell, and Raymond Bruce Smith, Wayne, N.J., assignors to Specialties Development Corporation, Belleville, N.J., a corporation of New Jersey
Filed Jan. 3, 1962, Ser. No. 164,077
3 Claims. (Cl. 340—213)

The present invention relates to condition responsive systems, and, more particularly, to such sysems which are prevented from giving a false indication in response to a circuit fault.

Electrical systems for indicating when a condition under observation, such as temperature, smoke density, humidity, salinity, pressure, radiation intensity or the like, has achieved a predetermined magnitude utilize a transducer to translate the presence of the condition into an electrical signal having a value which is dependent upon the magnitude of the condition. This signal is monitored by suitable circuitry, and, when it achieves a value indicating that the condition has reached the predetermined magnitude, an alarm or other indicating device is actuated in response to the signal.

In many of these systems, the signal normally produced by the transducer when the condition is at the predetermined magnitude, can be duplicated at other times by the occurrence of a particular circuit fault, for example, a short circuit or an open circuit within the transducer, and therefore a false indication will be given whenever that particular circuit fault occurs.

The present invention is generally concerned with providing condition indicating systems not subject to false indications from circuits faults, and is particularly concerned with providing an improved heat and flame detecting system of the type which comprises an elongated fire detecting element including two conductors within a metallic sheath and spaced apart by a thermistor material having a negative temperature coefficient of resistivity, and an indicating circuit for monitoring the resistance of the thermistor material and giving an indication when the resistance of the material indicates the presence of a fire or an overheat condition.

In this type of system, an indication is given whenever the resistance of the detecting element falls below a predetermined value. Thus, when a fault develops within the detecting element or associated circuitry which short circuits the thermistor material, the apparent resistance of the detecting element decreases sharply and a false indication is given.

Systems of this type are commonly used to protect aircraft, and such systems are subjected to constant vibration, particularly the detecting element thereof which is positioned within the engine housing. This constant vibration is capable of damaging or displacing a system component in a manner so that the detecting element becomes short circuited.

Although such short circuits are not too frequent, they occur more often than fires. Therefore, when the system gives a fire indication, there is a natural tendency on the part of the aircraft crew to disregard the warning on the premise that the indication is probably the result of a malfunction of the system unless signs of a fire actually are seen to the crew. This lack of faith in the accuracy of the fire warnings greatly reduces the effectiveness of the system because the initiation of emergency measures to put out the fire might be delayed until the fire reaches such a magnitude that it cannot be controlled and extinguished.

Accordingly, an object of the present invention is to provide an improved condition responsive system which is not subject to the foregoing difficulties.

Another object is to provide a more reliable condition responsive system.

Another object is to provide such a system which is capable of discriminating between signals resulting from the sensing of a condition and signals resulting from a circuit fault.

Another object is to provide such a system which is not subject to false indications due to circuit faults.

A further object is to provide such a system in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by providing in a condition responsive system, the combination of condition responsive means having an electrical property which varies in response to variations in the condition from a normal value when the condition is normal toward an extreme abnormal value when the condition becomes abnormal, first monitoring means responsive to a first predetermined value of the electrical property which value is between the normal value and the extreme abnormal value for giving an indication a predetermined time interval after the electrical property moves through the first predetermined value in changing from the normal value toward the extreme abnormal value, second monitoring means responsive to a second predetermined value of the electrical property which value is more extreme in the abnormal direction than the first predetermined value for inerting the first monitoring means when the electrical property changes in value from the first predetermined value to the second predetermined value in less than the predetermined time interval required to give the indication, whereby an indication resulting from a circuit fault is prevented.

A prefered embodiment of the invention has been chosen for purposes of illustration and description, and is shown in the accompanying drawings, forming a part of the specification, wherein:

FIG. 1 is a circuit diagram of a system in accordance with the present invention.

FIG. 2 is a graph illustrating the resistance of the sensing element at various times under various conditions.

Referring now to FIG. 1 of the drawing in detail, there is shown, by way of example, a system according to the present invention which generally comprises a temperature responsive sensing element 10, a source of direct current power 11, a resistance monitoring network 12 for giving an alarm when the resistance of the element 10 drops below a predetermined value, and a second resistance monitoring network 14 for inerting the network 12 when the decrease in resistance is due to a short circuit.

The sensing element 10 includes a pair of parallel conductors 15 and 16 positioned within a tubular metallic sheath 17 and spaced from each other and from the sides of the sheath by a mass of thermistor material 19.

The direct current source 11 is a full wave rectifier for receiving alternating current power through a step-down transformer 20 having a primary winding 21 and a secondary winding 22 provided with a center tap 24. The ends of the secondary winding 22 are connected through rectifying diodes 25 and 26 of like polarity to a conductor 27, and the center tap 24 is connected to a conductor 29. A 22 micro-farad capacitor 30 is connected between the conductors 27 and 29 to smooth the output of the diodes. The primary winding 21 is connected to a source of alternating current power of 115 volts at 400 cycles per second to produce 19 volts D.C. between the positive conductor 27 and the negative conductor 29, for example.

The resistance monitoring network 12 includes an adjustable resistor 31 connected in series with the element 10 between the conductors 27 and 29, an NPN type transistor 32 responsive to a predetermined division of voltage between the element 10 and the resistor 31, a second NPN type transistor 34 controlled by the output of the transistor 32, and a relay 35 controlled by the output of transistor 32 for actuating an alarm. The resistor 31 is adjustable between 3,000 and 500,000 ohms for presetting the operating point of the network 12.

The transistor 32 has a base electrode 36, an emitter electrode 37, and a collector electrode 39. The base 36 is connected to a point X at the junction of the sensing element 10 and the resistor 31 through a diode 40, and is also connected to the conductor 27 through an 82,000 ohm resistor 41. The collector 39 is connected to the conductor 27 through a 2,700 ohm resistor 42, and the emitter 37 is connected to the conductor 29 through a 47 ohm resistor 44.

The transistor 34 has a base electrode 45, an emitter electrode 46, and a collector electrode 47. The base 45 is connected to the collector 39 of the transistor 32 through a 27,000 ohm resistor 49 and is also connected to the conductor 29 through a 4,700 ohm resistor 50. The collector 47 is connected to the conductor 27 through the coil 51 of the relay 35, and the emitter 46 is directly connected to the emitter 37 of the transistor 32. The relay 35 includes a pair of contacts 52 under the control of the coil 51 connected to an alarm circuit (not shown) for giving an indication when the relay is de-energized.

A 3.3 micro-farad capacitor 54 is connected between the base 45 of the transistor 34 and the conductor 29 to delay the effect of a change in the output of the transistor 32 upon the transistor 34.

The second resistance monitoring network 14 includes an NPN type transistor 55 responsive to a second predetermined division of voltage between the sensing element 10 and the resistor 31, and an NPN type transistor 56 controlled by the output of the transistor 55 and having its output connected to the network 12 for preventing the actuation thereof under short circuit conditions.

The transistor 55 has a base electrode 57, an emitter electrode 59, and a collector electrode 60. The base 57 is connected to the point X through a diode 61 and is also connected through an 82,000 ohm resistor 62 to the conductor 27. The collector 60 is connected to the conductor 27 through a 2,700 ohm resistor 64, and the emitter 59 is connected to the conductor 29 through a 27 ohm resistor 65.

The transistor 56 has a base electrode 66, an emitter electrode 67, and a collector electrode 69. The base 66 is connected to the collector 60 of the transistor 55 through a 27,000 ohm resistor 70 and is also connected to the conductor 29 through a 4,700 ohm resistor 71. The emitter 67 is connected directly to the emitter 59 of the transistor 55, and the collector 69 is connected to the collector 39 of the transistor 32 (in the network 12) through a pair of contacts 72 which are part of the relay 35 and under the control of the relay coil 51.

In operation, when the sensing element 10 is subjected to normal temperatures its resistance is very high (60,000 to 500,000 ohms) as illustrated by the value $R_N$ on the curves shown in FIG. 2. Under this condition, substantially all of the source voltage is dropped across the sensing element 10, and the point X has a very high positive potential. Since the base 36 is connected to the positive conductor 27 and the emitter 37 is connected to the negative conductor 29, a current flows from the conductor 27 through the resistor 41, the base-emitter circuit of the transistor, and the resistor 44 to the conductor 29.

The point X is now more positive than the base 36, therefore, all of the current flowing through the resistor 41 flows through the base-emitter circuit of the transistor 32. This flow places the transistor 32 in full conduction allowing current to flow from the conductor 27 through the resistor 42, the collector-emitter circuit of the transistor, and the resistance 44 to the conductor 29. When the transistor 32 is in full conduction, the collector 39 is placed at a low positive potential which causes the base 45 of the transistor 34 to be less positive than the emitter 46 and the transistor is held in the non-conducting condition. The relay coil 51 is not energized, and the pairs of contacts 52 and 72 are in the position shown.

Under the foregoing described condition, the network 14 is in a similar condition with the transistor 55 in full conduction and the transistor 56 is held in the non-conducting condition.

As described hereinafter in detail, when the sensing element 10 decreases in resistance in response to heat, the network 12 operates to energize the relay 35 and produce an alarm, and when the sensing element 10 decreases in resistance due to a short circuit, the network 14 operates to inert the network 12 preventing a false alarm from being given.

As shown in FIG. 2, if the sensing element 10 is exposed to a fire at time $T_0$, represented by the point A on the curves, the resistance of the element decreases with time in a manner such as that shown by the curve ABCDE. If, on the other hand, the element becomes short circuited at the time $T_0$, the decrease in the element resistance is substantially instantaneous as defined by the curve AB'D'C'E'. To clarify this explanation, the time interval required for the decrease in resistance due to a short circuit is exaggerated in the curve AB'D'C'E'.

Considering first the operation of the system in response to a fire, as the resistance of the sensing element 10 decreases along the curve ABCDE the potential of the point X decreases. When the point X becomes less positive than the base 36, a portion of the current flowing through the resistor 41 is shunted through the diode 40 and the base current of the transistor 32 decreases. At some predetermined resistance of the sensing element, indicated in FIG. 2 as $R_F$ and represented by point B on the curve, sufficient current is diverted from the base circuit to reduce the collector current to a point where the base 45 of the transistor 34 is more positive than the emitter 46. The capacitor 54 charges to this new potential of the base 45 and, in so doing, diverts sufficient current from the base-emitter circuit of the transistor 34 to prevent it from becoming conductive for a period of time designated in FIG. 2 as $\Delta T$. When the capacitor 54 has charged, the transitsor 34 begins to conduct and the resulting increase in potential of the emitter 46 is fed back to the emitter 37 thereby driving the transistor 32 to cut off and placing the transistor 34 in full conduction. The coil 51 of the relay 35 is then energized closing the contacts 52 to give an alarm and opening the contacts 72 to open the collector circuit of the transistor 56 in the monitoring network 14. In FIG. 2, the operation of the relay 35 occurs at the time $T_2$ which is represented by the point C on the curve.

When the resistance of the sensing element decreases to a second and lower predetermined valve, indicated in FIG. 2 by the value $R_S$ and represented by point D on the curve sufficient current is diverted from the base circuit of the transistor 55 to decrease the collector current thereof to a point where a base current begins to flow in the transistor 56. The feed back connection between the emitter 67 and the emitter 59 drives the transistor 55 to cut off and increase the base emitter current of the transistor 56 to a point which would place the transistor in full conduction if the collector circuit thereof were closed. The transistor 55 responds to a lower element resistance than does the transistor 32 because the emitter resistor 65 is lower in value than the emitter resistor 44 so that the base-emitter current of the transistor 55 is greater than that of the transistor 32 at any particular resistance value of the sensing element 10.

Considering now the operation of the system in response to the short circuiting of the element, when the sensing element resistance decreases to the value $R_F$, represented by the point B' on the curve, the network 12 responds as previously described. However, before the time delay $\Delta T$ (due to the charging of the capacitor 54) has expired the sensing element resistance falls to the value $R_S$, point D' on the curve, and the network 14 is activated. The transistor 56 is then placed in full conduction and the collector current thereof flowing through the resistor 42 returns the potential at the collector 39 to the low value present when the transistor 32 is fully conductive. The transistor 34 is therefore prevented from going into conduction and a false alarm is prevented. When the short circuit is removed, the networks 12 and 14 return to their original condition and are ready to respond to any new decrease in the resistance of the sensing element 10.

The resistance values $R_F$ and $R_S$ of the sensing element 10, at which the networks 12 and 14 operate, are dependent upon the setting of the resistor 31 and may be shifted up or down so that the network 12 will respond to a predetermined temperature condition.

While the capacitor 54 is provided herein to delay the operation of the relay 35 for the time period $\Delta T$, this delay could be achieved by other means. For example, the relay 35 could be a slow acting relay which requires the time period $\Delta T$ for its operation.

Although the system described herein utilizes a transducer which responds to the condition to be detected by producing a signal capable of being simulated by a short circuit, the present invention is not limited to such system. It will be readily apparent that the present invention is also useful in systems including a transducer which responds to the condition to be detected by producing a signal capable of being simulated by an open circuit, as for example, a system incorporating a transducer which progressively increases in resistance over a finite period of time in response to the occurrence of the condition to be detected.

From the foregoing description, it will be seen that the present invention provides a simple, inexpensive, and dependable condition responsive system which discriminates between signals resulting from the sensing of a condition and signals resulting from a circuit fault, and which is not subject to false indications as a result of circuit faults.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a condition responsive system, the combination of
  (A) condition responsive means having an electrical property which varies in response to variations in said condition from a normal value when said condition is normal toward an extreme abnormal value when said condition becomes abnormal;
  (B) first means for monitoring said electrical property including
    (1) first switching circuit means having normal and operated conditions and connected to said condition responsive means to be placed in the operated condition in response to a first predetermined value of said electrical property which value is between said normal value and said extreme abnormal value including
      (a) inerting circuit means holding said first switching circuit means in its normal condition when a predetermined electrical current flows through said inerting circuit means,
    (2) self-resetting relay means including
      (a) control circuit means connected to said first switching circuit means to be energized only when said first switching circuit means is in its operated condition and
      (b) first switch means under the control of said control circuit means and connected to give an indication only when said control circuit means is energized, and
    (3) time delay means for delaying the operation of said first switching circuit means for a predetermined time interval after said electrical property moves through said first predetermined value in changing from said normal value toward said extreme abnormal value;
  (C) second means for monitoring said electrical property including
    (1) second switching circuit means
      (a) having an input connected to said condition responsive means and
      (b) having an output connected to said inerting circuit means and
      (c) being responsive to a second predetermined value of said electrical property which value is more extreme in the abnormal direction than said first predetermined value for operating to produce said predetermined current flow through said inerting circuit means to hold said first switching circuit means in its normal condition when said electrical property changes in value as a result of a circuit fault from said first predetermined value to said second predetermined value in less than said predetermined time interval required to give an indication, and
    (2) second switch means under the control of said circuit means of said relay means for normally providing the connection between said output of said second switching means and said inerting circuit means and for disconnecting said second switching circuit means from said inserting circuit means when said control circuit means is energized, whereby the system is prevented from giving an alarm in response to a circuit fault, is automatically resetting and the operation of said second switching circuit means after the expiration of the predetermined time interval will not interrupt the alarm.

2. In a condition responsive system, the combination of
  (A) condition responsive means having an electrical property which varies in response to variations in said condition from a normal value when said condition is normal toward an extreme abnormal value when said condition becomes abnormal;
  (B) first means for monitoring said electrical property including
    (1) a first switching circuit for operating to give an indication in response to a first predetermined value of said electrical property which value is between said normal value and said extreme abnormal value comprising
      (a) a first transistor
        (1) having an input circuit connected to said condition responsive means and
        (2) having a normally closed output circuit and
        (3) being responsive to said electrical property so as to operate and open said normally closed output circuit when said electrical property is at said first predetermined value,
(b) a circuit element connected to said normally closed output circuit of said first transistor to have a predetermined electrical current flowing therethrough when said normally closed output circuit is closed,
(c) a second transistor
(1) having an input circuit connected to said circuit element to be controlled by the current flowing therethrough and
(2) having a normally open output circuit and
(3) being responsive to the current flow through said circuit element to operate and close the output circuit of said second transistor only when the current flowing through said circuit element is below said predetermined value,
(d) self-resetting relay means including
(1) control circuit means connected to said output circuit of said second transistor to be energized only when the output circuit of said second transistor is closed and
(2) first switch means under the control of said control circuit means and connected to give an indication when said control circuit means is energized, and
(e) time delay means for delaying the operation of said first switch means for a predetermined time interval after said electrical property moves through said first predetermined value in changing from said normal toward said extreme abnormal value;
(C) second means for monitoring said electrical property and preventing a false indication in response to a circuit fault including
(1) a second switching circuit comprising
(a) a third transistor
(1) having an input circuit connected to said condition responsive means and
(2) having a normally closed output circuit and
(3) being responsive to said electrical properties so as to operate and open the output circuit thereof when said electrical property is at said second predetermined value, and
(b) a fourth transistor
(1) having an input circuit connected to the output circuit of said third transistor and
(2) having a normally open output circuit connected to said circuit element in parallel with the output circuit of said first transistor and
(3) being responsive to said electrical property so as to operate and provide said predetermined current flow through said circuit element when said electrical property is at a second predetermined value which value is more extreme in the abnormal direction than said first predetermined value whereby asid first switching circuit is prevented from giving an indication when said electrical property changes in value as a result of a circuit fault from said first predetermined value to said second predetermined value in less than said predetermined time interval, and
(2) second switch means under the control of said control circuit means of said relay means for normally providing the connection between said output circuit of said fourth transistor and said circuit element of said first switching circuit and for disconnecting said output circuit of said fourth transistor from said circuit element when said control circuit means is energized,
whereby the system is prevented from giving an indication in response to a circuit fault, is automatically resetting and the operation of said second switching circuit after the expiration of the predetermined time interval will not interrupt the indication.

3. A system according to claim 2, wherein said circuit element is a resistor connected in series with the parallel circuit comprising said output circuits of said first and fourth transistors to form a voltage dividing network, and the input circuit of said second transistor is connected to the junction of said resistor and said parallel circuit to hold said second transistor in its normal condition whenever the output circuit of either said first or fourth transistors is closed.

References Cited by the Examiner
UNITED STATES PATENTS

| 2,697,215 | 12/54 | Morris | 340—233 |
| 2,832,947 | 4/58 | Patchell et al. | 340—213 |
| 2,879,456 | 3/59 | Pinckaers | 317—148.5 |
| 2,901,739 | 8/59 | Freitas | 340—213 |
| 3,117,311 | 1/64 | Lemaire | 340—233 |

FOREIGN PATENTS
1,217,202  12/59  France.

NEIL C. READ, *Primary Examiner.*